ized.

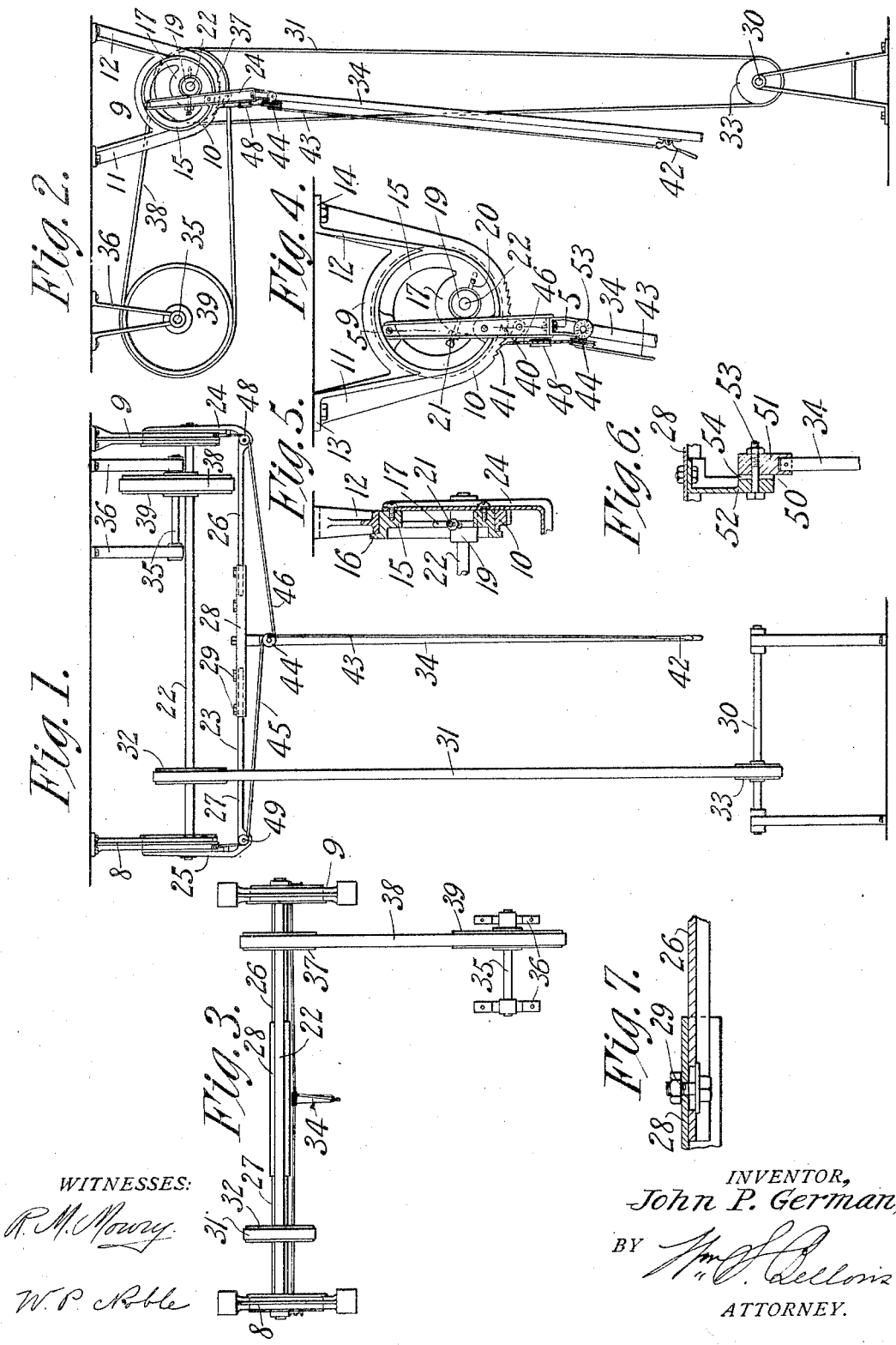
J. P. GERMAN.
BELT TIGHTENER.
APPLICATION FILED FEB. 8, 1913.
1,081,286. Patented Dec. 9, 1913.
WITNESSES:
R. M. Mowry
W. P. Noble
INVENTOR,
John P. German,
BY
ATTORNEY.

UNITED STATES PATENT OFFICE.

JOHN P. GERMAN, OF SPRINGFIELD, MASSACHUSETTS.

BELT-TIGHTENER.

1,081,286. Specification of Letters Patent. Patented Dec. 9, 1913.

Application filed February 8, 1913. Serial No. 747,180.

*To all whom it may concern:*

Be it known that I, JOHN P. GERMAN, a subject of the Queen of the Netherlands, and resident of Springfield, in the county of Hampden and State of Massachusetts, have invented certain new and useful Improvements in Belt-Tighteners, of which the following is a full, clear, and exact description.

The object of this invention is to provide a form of counter-shaft supporting device to support the shaft from the ceiling or other place in such a manner that by the operation of a depending arm or other connection with the device, the counter-shaft by the simple operation of swinging or shifting the arm, will be caused to approach and recede from the main power shaft; and the counter-shaft will also be moved toward and from the machine or tool on the floor that is driven from the counter-shaft, to slacken the driving belts, or to tension the same.

In the accompanying drawing showing one embodiment of my invention, Figure 1 is an elevation of the device shown as belted to drive a shaft on the floor. Fig. 2 is an end elevation of the parts shown in Fig. 1. Fig. 3 is a plan view. Fig. 4 is a side elevation enlarged of one of the hangers. Fig. 5 is a section on the line 5—5 indicated in Fig. 4; Fig. 6 is a section through the adjustable connection of the depending arm, and Fig. 7 shows the carrier adjustment.

As shown in the drawing a hanger device is provided that is composed of two hanger members denoted generally by 8 and 9, that are substantially identical. The hangers are each composed of a frame 10 in the form of a ring, with a pair of legs 11 and 12, having flange portions 13 and 14 for securing to the ceiling or other convenient place. In the circular bore of the ring is rotatively mounted a carrier, that is shown of annular form, comprising a ring 15 having a flange 16 for engaging the hanger. The carrier is provided with a supporting portion 17 containing an opening adapted to receive a journal bearing 19 that is suitably mounted therein, preferably by being adjustably located in the opening by the usual bolts or screws 20 and 21 located on opposite sides of the opening. These journal bearings it will be observed, are eccentrically located in the carriers, and they are so adjusted by the screws that the shaft 22 carried by the bearings will be parallel to the common axis of the two carriers. Therefore if these two carriers are swung in unison in the hangers the shaft will be shifted.

Means are provided for swinging the two carriers in unison, and they are shown as rigidly connected to a cross member. This member denoted generally by 23 has arms 24 and 25 at its ends, that are secured to the two carriers or rings 15. The member 23 is shown as lengthwise adjustable, comprising a portion 26 connected with another portion 27 by an intermediate bar 28; and such connection is by means of bolts 29 passing through slotted apertures in one of the members. By this means the two hanger members 8 and 9 can have their distance apart varied in order to accommodate different lengths of the counter-shaft 22.

The counter-shaft 22 is shown as driving a shaft 30 of a machine on the floor through a belt 31 connecting a pulley 32 on the shaft 22 with a pulley 33 on the shaft 30.

In order that the operator for the machine can readily swing the carriers, a depending member is provided from the cross bar 27, an arm 34 being shown depending from the connection 28 of the cross member and rigidly secured thereto by suitable means. By swinging this arm the two carriers are thereby caused to oscillate in the hanger, and by being properly assembled, the swinging of the arm will cause the shaft 22 to be moved toward and from a power shaft 35 supported from the ceiling by hangers 36 in the usual manner. The shaft 22 is shown as carrying a pulley 37 that is connected by a belt 38 with a pulley 39 on the shaft 35; consequently, when the handle is moved in one direction and the shaft 22 is thereby moved toward the power shaft the belt 38 will be somewhat slackened, and the movement of the arm in the opposite direction will cause the belt to be put under proper driving tension. The shaft 22 is also shown as so arranged that the same oscillation of the carriers will cause the shaft to change its horizontal position, and thereby vary its distance from the shaft 30 on the floor, which will result in the driving belt 31 to be tensioned or slackened. And this arrangement will result in one movement of the depending arm causing the counter-shaft 22 to be moved nearer to the power shaft and at the same time be brought nearer to the driven shaft 30, and hence both of the belts 31 and 38 will have their tension reduced; while reverse movement of the arm will so shift the counter-shaft that both of the belts will be again put under proper driving tension.

Means are also provided for locking the carriers in their supporting hangers in order that the proper tension on the belts shall be maintained. Each of the arms 24 and 25 is provided with a spring pawl 40 arranged to engage teeth 41 on the adjacent part of the hanger, and as the carriers are swung to increase the tension on the belts the pawls will engage the successive teeth to prevent reverse movement of the carriers. Means are provided extending down the depending arm for operating both of the pawls to release the carriers. A lever 42 is shown on the lower end of the arm 34, and a cable or wire 43 connects with a crank disk 44 at the upper part of the arm. From this disk cables 45 and 46 pass in opposite directions along the support 27, thence around guides 48 and 49 and are attached to the pawls 40 respectively. When the lever 42 is swung, the two pawls will be both moved away from the hanger teeth and the carriers will be free to move; but as soon as the handle is released the pawls will engage the hangers to lock the carriers in adjusted positions. It will therefore be understood that when the two belts are under proper tension to drive the counter-shaft from the power shaft, and from the latter to operate the machine shaft 30, the simple operation of swinging the lever 42 to release the pawls, and then giving a small swing to the arm 34, will cause the counter-shaft 22 to both move downwardly toward the machine shaft, and to move toward the power shaft 35, and will result in giving a slack to both the horizontal and the vertical belt. To restore these belts to their proper tension requires merely the swinging of the lever 42 in the reverse direction, when the two pawls will engage the hangers and lock the carriers in position to maintain the proper tension on the belts. The advantages of such an arrangement are that both of the belts have their strain relieved by the very simple operation of merely shifting an arm; and furthermore the strain on the counter-shaft and its bearings is at once removed, as is also the strain on the main power shaft caused by the tension of the belt that drives the counter-shaft; and furthermore the strain on the shaft and the bearings of the machine on the floor is at once removed. This will result in a great economy in the use of belting, as whenever the machine is stopped for more than a short period of time, the stress is at once removed from the several belts, and as two belts generally connect the power shaft with the counter-shaft to drive it in connection with a reversing clutch, the strain on free belts is taken off by the mere shifting of the depending arm.

Means are also provided for adjusting the connection between the depending arm and the two carriers; the arm 34 having an adjustable clamp at 50 in the form of a block 51 that is secured to a bracket 52 fast on the connecting piece 28; these two members being locked in adjusted positions by a bolt 53, the abutting faces of the two members being suitably roughened, such as by having radial ribs and flutes at 54. By this means the handle 34 can be placed at a convenient position to the operator of the machine on the floor.

While but two of the hangers with the oscillating carriers are shown, it is obvious that these members can be duplicated and intermediate hangers and carriers provided for the shaft, to be connected with the cross member in the same manner.

Having thus described my invention, what I claim is:—

1. A shaft hanger device comprising a pair of hangers, a carrier rotatively mounted in each of the hangers with their axes coincident, a pulley shaft bearing eccentrically located on each carrier, a depending bar fast to each carrier, a transverse bar rigidly connecting said bars to maintain said carriers relatively immovable and the bearings in alinement, a depending arm rigidly connected to said transverse bar to swing the carriers in unison and shift them both vertically and horizontally, a pawl on each of the depending bars, each of the hangers having teeth engaged by the pawls, a handle on the lower end of said arm, and connections between the handle and the pawls to swing the pawls in unison to lock the carriers to the hangers.

2. A shaft hanger device comprising a pair of hangers, a carrier rotatively mounted on each of the hangers with their axes coincident, a pulley shaft bearing eccentrically mounted on each carrier, each carrier having a flange on one side engaging the hanger, a depending bar fast to each carrier on the side opposite the flange and engaging the hanger to retain the carrier on the hanger, a transverse bar rigidly connecting said bars to maintain said carriers relatively immovable and the bearings in alinement, a depending arm rigidly connected to said transverse bar to sw ing the carriers in unison and shift them vertically and horizontally, a pawl on each of the depending bars, each of the hangers having teeth engaged by the pawls, a handle on the lower end of said arm, and connections between the handle and the pawls to swing the pawls in unison and lock the carriers to the hangers.

Signed by me at Springfield, Mass., in presence of two subscribing witnesses.

JOHN P. GERMAN.

Witnesses:
G. R. DRISCOLL,
J. D. LONG.

Copies of this patent may be obtained for five cents each, by addressing the "Commissioner of Patents, Washington, D. C."